United States Patent
Townsend et al.

(10) Patent No.: US 6,788,251 B2
(45) Date of Patent: Sep. 7, 2004

(54) METHOD AND APPARATUS FOR INTERFERENCE REDUCTION IN A POSITIONING SYSTEM

(75) Inventors: Todd V. Townsend, Fremont, CA (US); Sergey Lyusin, Moscow (RU)

(73) Assignee: Thales Navigation, Inc., Santa Clara, CA (US)

( * ) Notice: Subject to any disclaimer, the term of this patent is extended or adjusted under 35 U.S.C. 154(b) by 0 days.

(21) Appl. No.: 09/848,768

(22) Filed: May 3, 2001

(65) Prior Publication Data

US 2004/0004570 A1 Jan. 8, 2004

Related U.S. Application Data

(60) Provisional application No. 60/201,625, filed on May 3, 2000.

(51) Int. Cl.[7] .................................................. G01S 3/28
(52) U.S. Cl. .............. 342/384; 342/357.02; 342/357.04
(58) Field of Search ........................... 342/145, 357.01, 342/357.02, 357.04, 384

(56) References Cited

U.S. PATENT DOCUMENTS

| | | | |
|---|---|---|---|
| 4,087,654 A | 5/1978 | Mueller .................. 379/406.08 |
| 4,178,550 A | 12/1979 | Acampora et al. | |
| 4,445,118 A | 4/1984 | Taylor et al. | |
| 5,702,070 A | 12/1997 | Waid | |
| 5,913,170 A | 6/1999 | Wortham | |
| 5,917,444 A | 6/1999 | Loomis et al. | |
| 5,963,582 A | 10/1999 | Stansell | |
| 5,977,909 A | 11/1999 | Harrison et al. | |
| 6,047,017 A | 4/2000 | Cahn et al. | |
| 6,064,336 A | 5/2000 | Krasner | |
| 6,067,045 A | 5/2000 | Castelloe et al. | |
| 6,114,991 A | 9/2000 | Richton et al. | |
| 6,134,483 A | 10/2000 | Vayanos et al. | |
| 6,178,425 B1 | 1/2001 | Brodersen et al. ........... 707/101 |
| 6,189,011 B1 | 2/2001 | Lim et al. ................... 707/102 |
| 6,211,819 B1 | 4/2001 | King et al. | |
| 6,226,650 B1 | 5/2001 | Mahajan et al. ............ 707/201 |
| 6,633,255 B2 | 10/2003 | Krasner ................. 342/357.12 |
| 2002/0084933 A1 | 7/2002 | Krasner ................. 342/357.01 |

FOREIGN PATENT DOCUMENTS

WO 01/84176 11/2001

*Primary Examiner*—Dao Phan
(74) *Attorney, Agent, or Firm*—Lowe Hauptman Gilman & Berner, LLP

(57) ABSTRACT

Embodiments of the present invention relate to a method and apparatus for reducing interference in a positioning system. According to one or more embodiments of the present invention, the receiver in a conventional positioning system is configured to communicate with a terrestrial broadcast station. The terrestrial broadcast station transmits assistance signals to the receiver and may be another receiver. The assistance signals enable the receiver to locate very weak signals being transmitted from the satellites in the positioning system. In one embodiment, the assistance signals include Doppler frequencies for the satellites. In another embodiment, the assistance signals include Ephemeris data. In another embodiment, the assistance signals include almanac data. In other embodiments of the present invention, the assistance signal includes navigation bits demodulated from the carrier phase inversion signal of the satellite, time synchronization signals, and pseudo range differential corrections. A conventional correlation path is used to provide ghost satellite cancellation. When a signal is detected in the conventional path, it is inverted and subtracted from the assisted correlation path.

18 Claims, 7 Drawing Sheets

| 501A | 501B | 501C | 501D | 501E | | 501N |
|---|---|---|---|---|---|---|
| C CODE | C CODE-1 | C CODE | C CODE | C CODE-1 | ••• | C CODE |

METHOD AND APPARATUS FOR INTERFERENCE REDUCTION IN A POSITIONING SYSTEM

Applicant hereby claims priority to provisional patent application No. 60/201,625 filed May 3, 2000.

BACKGROUND OF THE INVENTION

1. Field of the Invention

The present invention relates to locating the position of an object, and in particular embodiments of the present invention are directed toward using a satellite positioning system to locate the position of objects that are obstructed.

2. Background Art

People use positioning systems to precisely determine the locations of objects. One type of positioning system is the Global Positioning System (GPS) and uses multiple satellites that orbit the earth. The satellites transmit signals to earth that can be detected by anyone with a receiver. Currently, however, it is impossible to track objects using the receiver when the object is obstructed, for instance within an enclosed structure such as a parking garage or building, or under a tree or bridge. Before further discussing the drawbacks associated with current positioning systems, it is instructive to discuss navigation generally.

Navigation

Since the beginning of recorded time, people have been trying to figure out a reliable way to determine their own position to help guide them to where they are going and to get them back home again. On land people relied on maps, landmarks, and local residents to navigate. There are no landmarks or residents on the ocean, however, so sea travel was particularly difficult. To avoid getting lost, early sailors followed the coastline closely, rarely going out of sight of land. When humankind first sailed into the open ocean, they used the stars to chart their path. The north star was used in the northern hemisphere but was not available once a ship was too far south of the equator. The compass was also used to determine the direction of North but could only provide direction information, but not position information. Eventually clocks were developed that could be used at sea so that longitudinal (east west) directions could be determined.

Still, however, it was impossible to exactly where you were with any precision. In modern times, the need and desire to know the exact location on sea or land within meters arose. Military, commercial, and personal requirements created the need for more accurate positioning systems. In the early 20th century ground based radio navigation systems were developed. One drawback of using a ground based radio system is the tradeoff between coverage and accuracy. High-frequency radio waves provide accurate position location but can only be picked up in a small, localized area. Lower frequency radio waves cover a larger area, but cannot pinpoint the location of an object with precision.

Satellite Positioning System

To partially solve the problems associated with ground-based navigation systems, high-frequency radio transmitters were placed in space as part of the GPS system. As is well known, GPS was established by the United States government, and employs a constellation of satellites in orbit around the earth at an altitude of approximately 26500 km. Currently, the GPS constellation consists of 24 satellites, arranged with 4 satellites in each of 6 orbital planes. Each orbital plane is inclined to the earth's equator by an angle of approximately 55 degrees.

Each GPS satellite transmits microwave L-band radio signals continuously in two frequency bands, centered at 1575.42 MHz and 1227.6 MHz., denoted as L1 and L2 respectively. The GPS L1 signal is quadri-phase modulated by a coarse/acquisition code ("C/A code") and a precision ranging code ("P-code"). The L2 signal is binary phase shift key ("BPSK") modulated by the P-code. The GPS C/A code is a gold code that is specific to each satellite, and has a symbol rate of 1.023 MHz. The unique content of each satellite's C/A code is used to identify the source of a received signal. The P-code is also specific to each satellite and has a symbol rate of 10.23 MHz. The GPS satellite transmission standards are set forth in detail by the Interface Control Document GPS (200), dated 1993, a revised version of a document first published in 1983.

Another satellite positioning system is called GLONASS. GLONASS was established by the former Soviet Union and operated by the Russian Space Forces. The GLONASS constellation consists of 24 satellites arranged with 8 satellites in each of 3 orbital planes. Each orbital plane is inclined to the earth's equator by an angle of approximately 64.8 degrees. The altitude of the GLONASS satellites is approximately 19100 km.

The satellites of the GLONASS radio navigation system transmit signals in the frequency band near 1602 MHz, and signals in a secondary band near 1246 MHz, denoted as L1 and L2 respectively. The GLONASS L1 signal is quadri-phase modulated by a C/A code and a P-code. The L2 signal is BPSK modulated by the P-code. Unlike GPS, in which all of the satellites transmit on the same nominal frequency, the GLONASS satellites each transmit at a unique frequency in order to differentiate between the satellites. The GLONASS L1 carrier frequency is equal to 1602 MHz+k*0.5625 MHz, where k is a number related to the satellite number. The GLONASS L2 carrier frequency is equal to 1246 MHz+k*0.5625 MHz. The GLONASS C/A code consists of a length 511 linear maximal sequence. Details of the GLONASS signals may be found in the Global Satellite Navigation System GLONASS—Interface Control Document of the RTCA Paper No. 518-91/SCI59-317, approved by the Glavkosmos Institute of Space Device Engineering, the official former USSR GLONASS responsible organization.

In addition to transmitting high frequency signals, both satellite systems send navigation messages and ephemeris data. The navigation message is a low frequency signal that identifies the satellite and provides other information. The ephemeris data provides information on the path and position of the satellite.

Current Receivers

Conventional receivers, called GPS or SPS receivers, work well when the signals travel directly from the satellite to the receiver with no obstructions in the way. When passing under trees, bridges, through garages and when the receiver is in a building, however, problems occur. Specifically, these objects present barriers that interfere with the signal and weaken it. Even worse, the navigation message, which is typically more difficult to detect than the signals, is often undetectable when there are obstructions.

Secondly, the receiver relies on detecting reflected signals. Obstructions between the signal sent by the satellite and the receiver compromise the signal path. The signal reflects off nearby surfaces and then to the receiver. Some of these signals may be stronger than another, even though the distance the signal travels is further, depending on the reflecting surface or surfaces. This extra distance traveled by the signal can introduce errors into the distance and location calculations.

It is desirable to overcome this difficulty for a variety of reasons. First, it would be desirable to locate an object in a building in order to allow the users of positioning devices to obtain a fix and assess position-related data to access nearby services. Second, federal mandates may require the ability to locate cell phone users to a high degree of accuracy (e.g. within 100 feet) so that 911 services can locate an emergency caller even when the cell phone is used in a building or obstructed area. It would be desirable to provide a SPS receiver to overcome the above problems.

SUMMARY OF THE INVENTION

Embodiments of the present invention relate to a method and apparatus for reducing interference in a positioning system. According to one or more embodiments of the present invention, the receiver in a conventional positioning system is configured to communicate with a terrestrial broadcast station. The terrestrial broadcast station transmits assistance signals to the receiver and enable the receiver to locate very weak signals being transmitted from the satellites in the positioning system.

In one embodiment, the assistance signals include Doppler frequencies for the satellites. In another embodiment, the assistance signals include Ephemeris data. In another embodiment, the assistance signals include almanac data. Almanac data is a list of satellites that a particular receiver should be able to access currently. This prevents the receiver from searching for satellites, for instance, that are below the horizon and not currently usable. In other embodiments of the present invention, the assistance signal includes navigation bits demodulated from the carrier phase inversion signal of the satellite, time synchronization signals, base station coordinates for 1 ms ambiguity resolution, and pseudo range differential corrections.

The assistance information may be provided by a wire, a computer network such as the Internet, or it may be provided wirelessly, such as via a cellular telephone network, wireless data network, a secondary carrier on a transmitter in the commercial broadcast service (TV or AM/FM radio) or by another equivalent means. The assistance signal permits the use of a coherent decoding and the provision of needed data which enables a receiver with a weak acquisition to maintain a lock even when it does not have a strong enough signal acquisition to independently decode needed data. A conventional correlation path is used to provide ghost satellite cancellation. When a signal is detected in the conventional path, it is inverted and subtracted from the assisted correlation path.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The invention relates to a method and apparatus for reducing interference in a positioning system. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention.

Positioning System Using Assistance Signals

Figure 1:
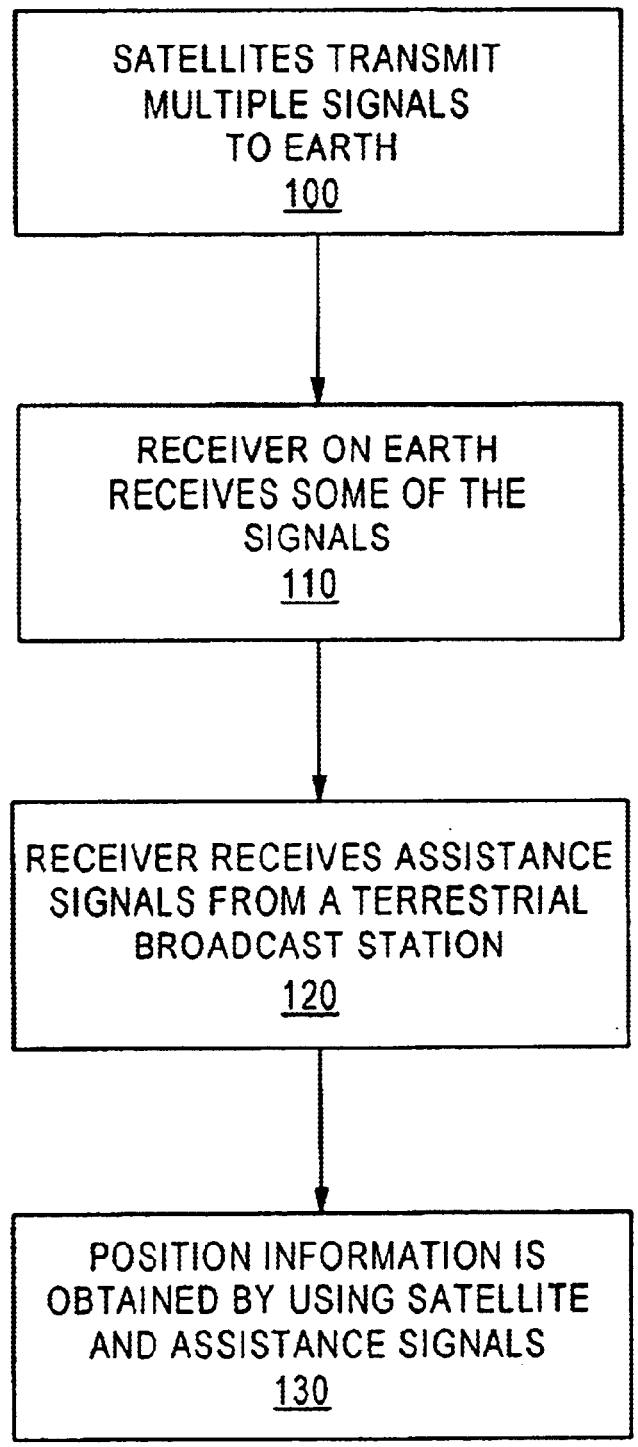
FIG. 1 is a low signal-to-noise ratio positioning system according to an embodiment of the present invention.

One embodiment of the present invention is shown in FIG. 1. At step 100, signals are transmitted from multiple satellites to earth. Then, at step 110, a receiver located on earth receives some of the signals. Next, at step 120, assistance signals are transmitted from a terrestrial broadcast station. Finally, position information is obtained at step 130 by using the satellite and assistance signals.

As shown at step 120 of FIG. 1, assistance signals are sent from a terrestrial broadcast station to a receiver to assist the receiver in obtaining positioning information, specifically when the receiver is indoors or when obstacles are in the way. The assistance signals may have various information in them according to various embodiments of the present invention. In one embodiment, the assistance signals have Doppler frequencies for the satellites.

Doppler Frequencies

The satellites themselves are traveling very fast in orbit around the earth. Therefore, it is inevitable that the signal sent by the satellite will be altered by the Doppler effect. In practical terms this means, for instance, that if all satellites are transmitting signals at 1575 megahertz then a receiver must locate and receive each of these signals at something other than 1575 megahertz, depending on the direction the satellite is currently traveling.

In one embodiment of the present invention, a terrestrial broadcast station in the general vicinity as a target receiver is chosen where the terrestrial broadcast station is in a more ideal position to receive and calculate accurate Doppler information. This might include, for instance, a broadcast station that has a more powerful antenna or is farther away from obstacles. The broadcast station should be sufficiently close (within 50 to 100 miles, for instance) so that its Doppler shifts are substantially the same as the target receiver and its signals are received from the same satellites. The terrestrial broadcast station, then, is able to locate the satellites and calculate their frequency variations based on the Doppler effect and transmit this information to the target receiver.

In practical terms, this means that a receiver that is obstructed does not have to search the spectrum to locate the correct frequencies for satellite signals varied by the Doppler effect. The assistance signal tells the receiver exactly what frequency to use. Then, the receiver is able to tune to exactly that frequency and no time is expended searching through frequency ranges to lock in on Doppler affected satellite frequencies and the obstructed receiver may immediately begin to correlate the messages in the signal.

Figure 2:
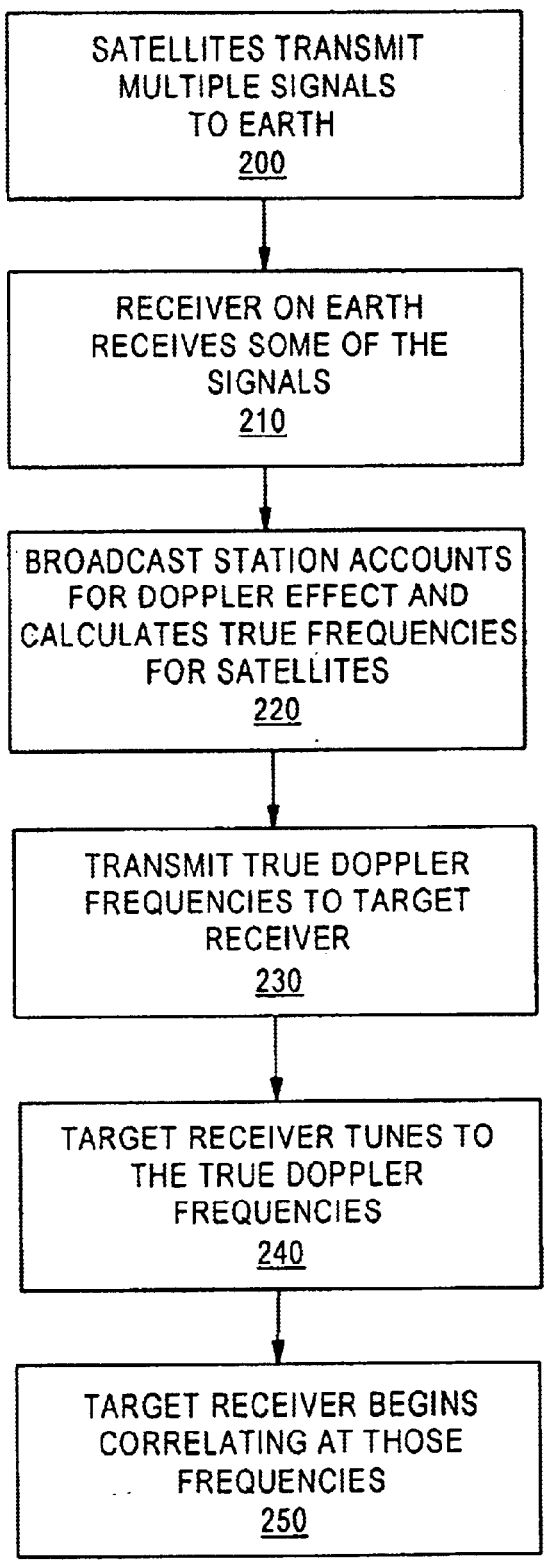
FIG. 2 shows the use of an assistance signal according to an embodiment of the present invention.

This embodiment of the present invention is shown in FIG. 2. At step 200, signals are transmitted from multiple satellites to earth. Then, at step 210, a receiver located on earth receives some of the signals. Next, at step 220, a terrestrial broadcast station that is located sufficiently near to the target receiver calculates true Doppler frequencies for the satellites. Then, at step 230, the true Doppler frequencies are transmitted to the target receiver. Thereafter, the target receiver uses the true Doppler frequencies and tunes to those frequencies at step 240, and begins correlating at those frequencies at step 250.

Ephemeris Data

In one embodiment of the present invention, the assistance signals provide Ephemeris data. Ephemeris data is data that tells the target receiver exactly where each satellite is. Knowing the location of each satellite is essential to calculating the receiver's position. Take, for instance, the case where a receiver is located indoors. Even if the receiver was broadcast Doppler information from a terrestrial broadcast station, the receiver still might not be able to obtain a positional fix because the information telling it where the satellites are was to weak to reach it.

Figure 3:
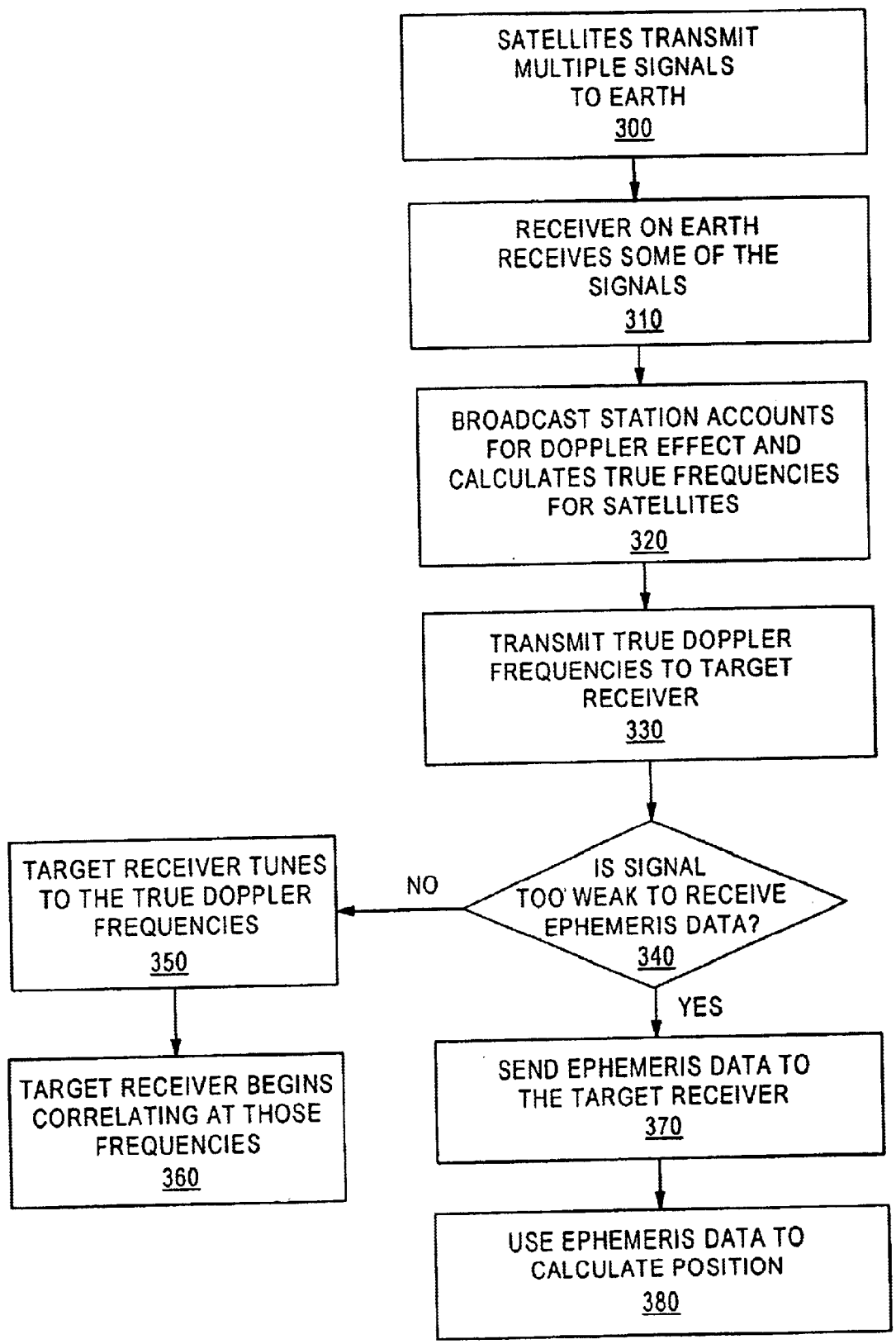
FIG. 3 shows the use of an assistance signal according to another embodiment of the present invention.

This embodiment of the present invention is shown in FIG. 3. In FIG. 3, signals are transmitted from multiple satellites to earth at step 300. Then, at step 310, a target receiver located on earth receives some of the signals. Next, at step 320, a terrestrial broadcast station that is located sufficiently near to the target receiver calculates true Doppler frequencies for the satellites. Then, at step 330, the true Doppler frequencies are transmitted to the target receiver.

Thereafter, at step 340, it is determined if the signal from the satellite is too weak to receive Ephemeris data. If not, the target receiver uses the true Doppler frequencies and tunes to those frequencies at step 350, and begins correlating at those frequencies at step 360. Otherwise, a terrestrial broadcast station sends Ephemeris data to the receiver at step 370 and the receiver calculates position using the Ephemeris data at step 380.

Almanac Data

At any given moment, only a portion of the satellites in a positioning system are currently usable. This is because as the satellites orbit the earth some fall below the horizon. When this happens, the signal from that satellite cannot be used, and is not expected to be used, by the receiver. Almanac data is used to inform a receiver exactly what satellites should currently be used. In one embodiment of the present invention, almanac data is calculated at a broadcast station and sent as part of the assistance signal so that the target receiver does not waste time looking for and trying to receive signals from a satellite that is below the horizon or otherwise not desirable.

Figure 4:
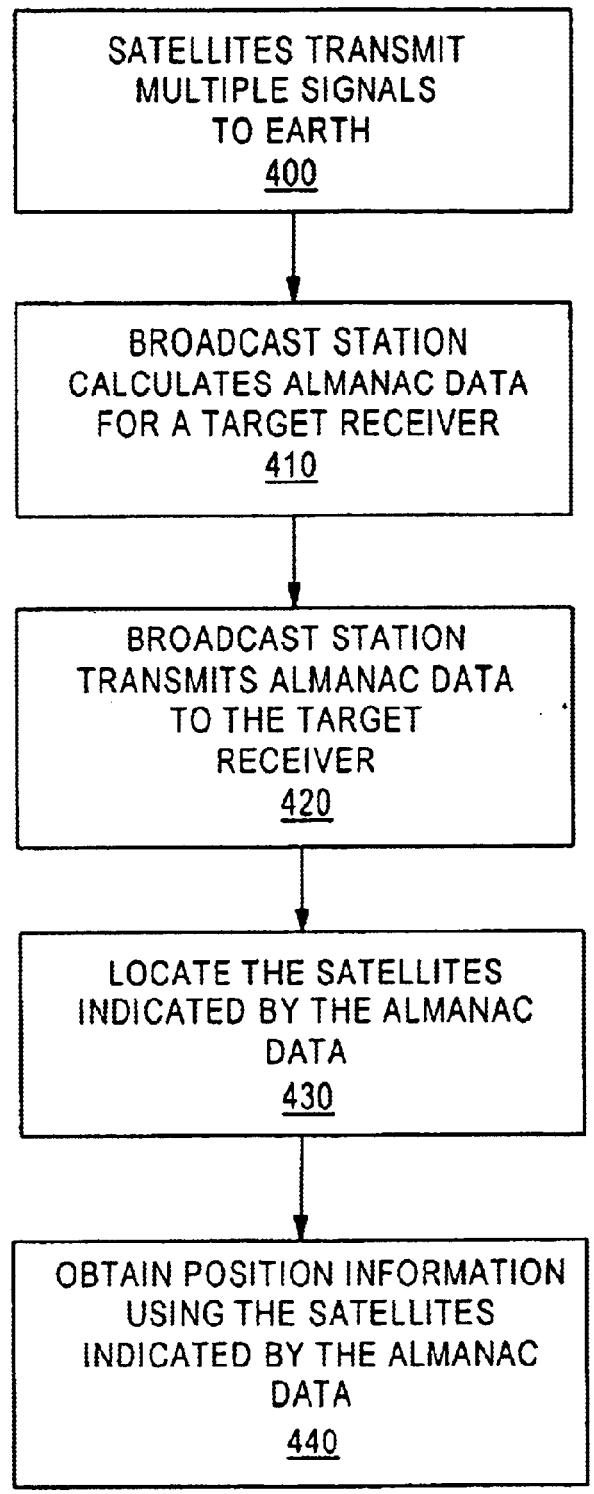
FIG. 4 shows the use of an assistance signal according to another embodiment of the present invention.

This embodiment of the present invention is shown in FIG. 4. At step 400, signals are transmitted from multiple satellites to earth. Then, at step 410, a broadcast station calculates almanac data for a target receiver. Next, at step 420, the assistance signals, including the almanac data, are transmitted from a terrestrial broadcast station to the target receiver. Thereafter, the target receiver locates the satellites indicated in the almanac data at step 430. Finally, position information is obtained at step 440 by using the satellites indicated in the almanac data.

Navigation Message

The navigation message of a satellite can cause a problem for indoor receiving. This is due to the interaction between the correlation code of a satellite and the navigation message broadcast by the satellite. Each satellite broadcasts a high frequency signal (e.g. 1 MHz) of 1's and 0's. This signal is called the correlation code and is a pseudo random string of digital data that repeats at a high bit rate. The navigation message is also a digital message that is broadcast at a much lower bandwidth, several orders of magnitude slower than the correlation data rate. In one implementation, the navigation data is inserted into the correlation data stream as a series of inversions of the correlation data string. For example, a noninverted correlation data string could represent a digital 1 while an inverted correlation data string could represent a digital zero. Thus, for every 100,000 bits of correlation data (when a correlation data string is 100,000 bits in length), only a single navigation message bit is sent.

Figures 5, 6:
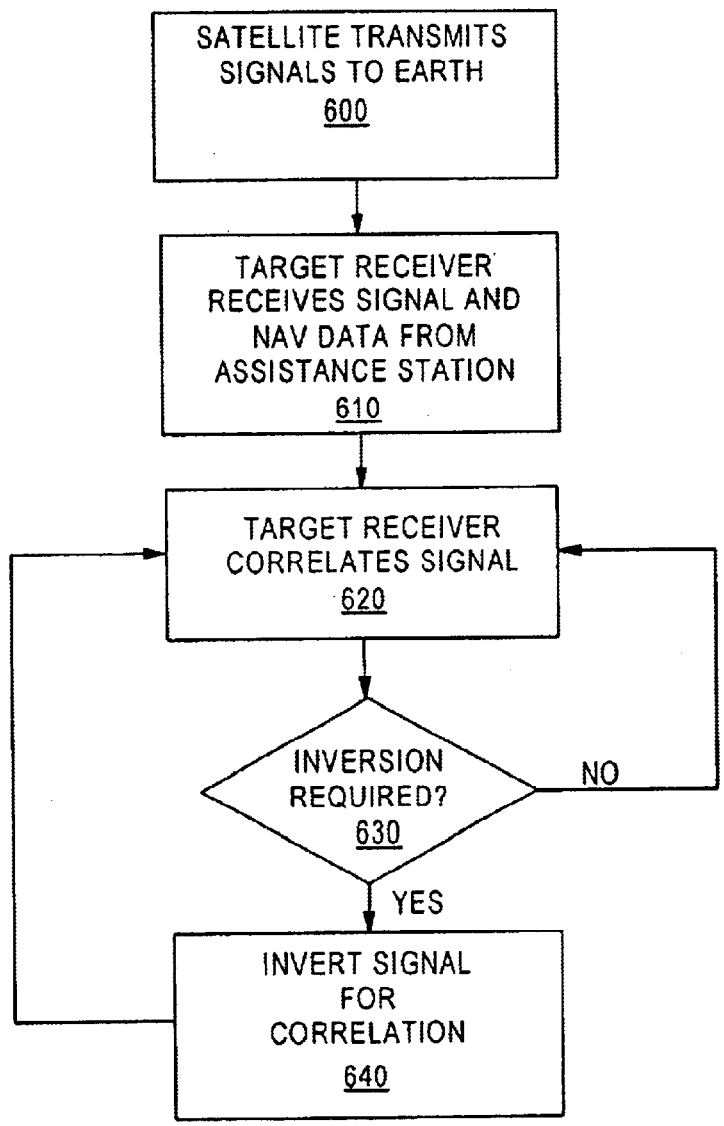
FIG. 5 is a digital message from a satellite to a receiver according to an embodiment of the present invention.
FIG. 6 shows the use of an assistance signal according to another embodiment of the present invention.

The data system is shown in FIG. 5. A repeating series of correlation code bit strings 501A–501N are transmitted. Periodically, the correlation code bit strings are entirely inverted, such as at location 501B and 501E. The noninverted strings represent a navigation message bit with a value of 1 while the inverted strings represent a 0 navigation message bit.

For typical outdoor operation of a receiver, this system works adequately because the receiver is able to capture the correlation data relatively easily. At each navigation data transition from one polarity to another (e.g. a 1 bit to a 0 bit or vice-versa) the correlator of a receiver loses its correlation. The receiver assumes that an inversion has occurred, notes the navigation message bit value, and then attempts to lock onto the inverted correlation data string, usually successfully before the next navigation message bit transition.

This does not work as well in indoor uses. There, the receiver may need to correlate for a much longer period of time to achieve an adequate signal to noise ratio. The present invention solves this problem by sending the navigation message bits to the receiver via the terrestrial broadcast station. In this manner, the receiver can predict the inversions and look for the inverted string without ever losing the correlation on the satellite signal. When the transition of the correlation code string is about to occur based on the received navigation message data from the terrestrial broadcast station, the receiver can invert the signal so that the correlator maintains its lock on the correlation code.

The operation of this system is illustrated in the flow diagram of FIG. 6. At step 600, the satellite transmits the correlation code signal string to Earth, inverting it periodically to represent navigation message data bits. The target receiver receives the signal from space and the navigation message data from a terrestrial broadcast station at step 610. At step 620, the receiver correlates the data from the satellite. At decision block 630, the receiver uses the navigation message data from the terrestrial broadcast station to determine if an inversion of the navigation signal is about to occur. If no, the receiver continues correlating the signal at step 620. If yes, the receiver inverts the incoming correlation signal at the appropriate transition time at step 640 so that there is no loss of correlation due to data inversion. The system continues correlating at step 620.

The broadcast station should be relatively close, less than 100 miles away for instance, so that they receive essentially the same signal from the satellite. Using the string sent from the broadcast station, the target receiver is able to know when the inversions will occur, look for the inversions, and hence, the navigation message, while at the same time continuing to correlate on the weak signal.

Assistance Signal Architecture

Figure 7:
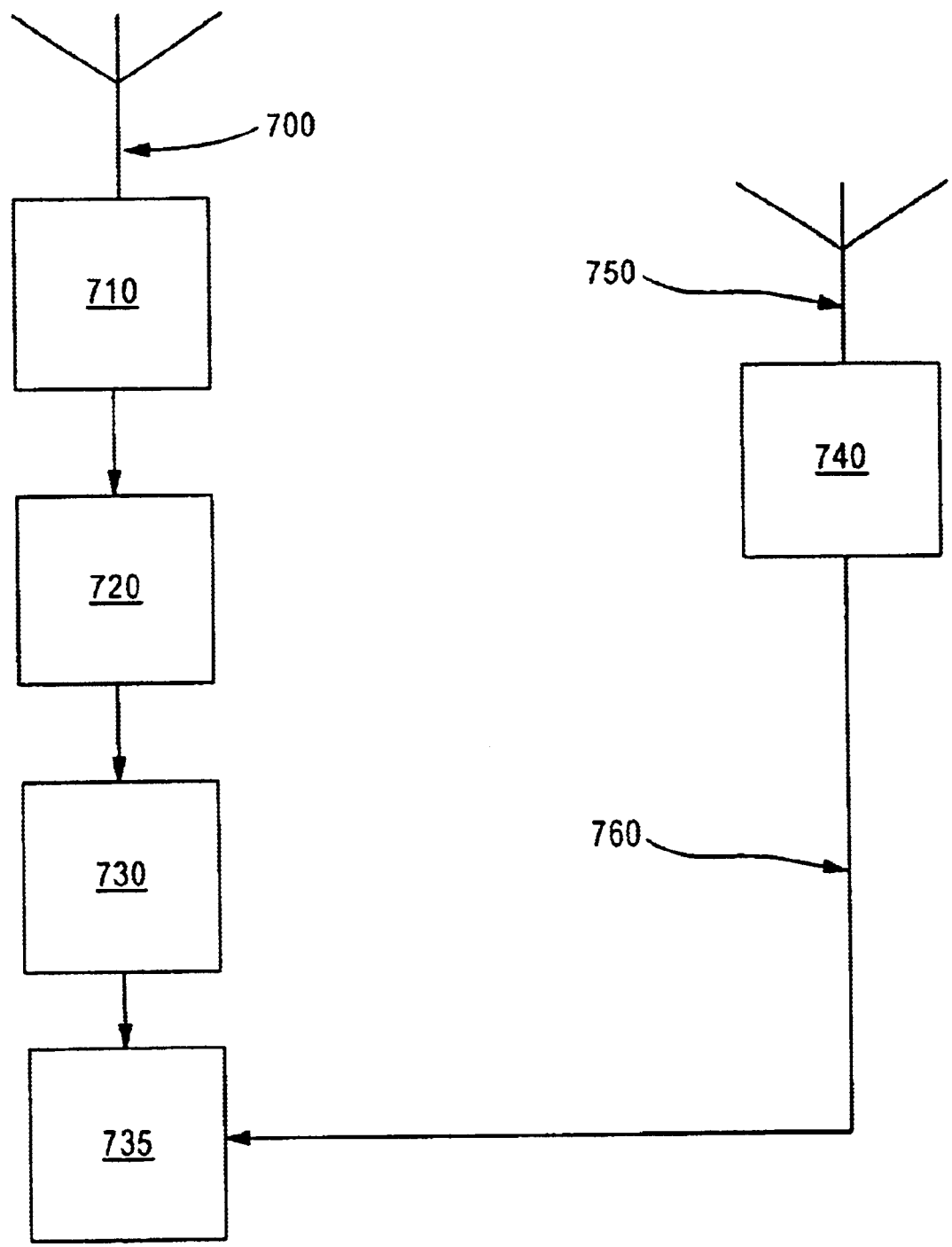
FIG. 7 shows a positioning system architecture according to an embodiment of the present invention.

An example of an architecture that may be used to transmit assistance signals is shown in FIG. 7. A positioning system antenna 700 receives a satellite signal and transmits it to a positioning system radio frequency (RF) part 710. RF part 710 might include, for instance, conventional means for amplifying the received signal (amplifier), filtering it, and down-converting it to an appropriate intermediate frequency. The amplified and down-converted signal is then applied to a conventional analog to digital converter 720. The output of the converter 720, which represents the digital amplitude samples of the down-converted positioning system signal is stored in a memory 730 for subsequent signal processing.

When appropriate, the positioning system signal stored in memory 730 is transmitted to receiver logic unit 735. A broadcast station 740 having its own antenna 750 also receives signals from satellites and transmits assistance signal 760 to receiver logic unit 735 as well. Receiver logic unit 735 is configured to respond to multiple types of assistance data. In the case where the navigation message is sent in the assistance signal, receiver logic unit 735 might perform a re-inversion of the data when the navigation message inverts, for instance by correlating with a matched filter, a correlater, a Fast Fourier Transform (FFT) unit, or other suitable device.

Receiver logic unit 735 may be a component of a computing device, such as a personal digital assistant, cellular phone, or general purpose computer. Assistance signal 760 may be a provided by a wire, a computer network such as the Internet, or it may be provided wirelessly, such as via a cellular telephone network, wireless data network, a secondary carrier on a transmitter in the commercial broadcast service (TV or AM/FM radio) or by another equivalent means. Memory unit 730 may be used to store data that is not completely transient in nature (i.e., Ephemeris data) and transmit it later to the receiver logic unit 735 when needed.

Ghost Satellite

Satellites use unique codes to reduce the likelihood of misidentification of a satellite. These codes are known as "Gold Codes". Gold codes are series of identification signals sent by the satellites that have unique properties. Gold codes are identification strings approximately one thousand bits long. Of the possible one thousand bit strings, around sixty are chosen. Each of the chosen Gold codes is orthogonal.

The chance that a receiver that is correlating to a certain signal could correlate to the signal from another satellite is low but is possible. This condition can arise when the potentially interfering signal becomes significantly stronger than the desired signal. This can occur when the signal from the desired satellite is attenuated by some physical interference but the signal from the undesired satellite has a clearer path to the receiver (often via a reflection path). The undesired signal is considered to be a "ghost" signal and its source is a "ghost" satellite. The orthogonality of the Gold Codes usually means that if a correlator is locking in on an identification string and a ghost signal interferes, another satellite's identification string will not be obtained. Orthogonality, however, is only effective at certain levels. Namely, if the interfering signal becomes much stronger then the desired signal, then the correlator may read that signal as being the desired signal (ghost satellite effect).

Take, for instance, the user of a receiver that is blocked by a number of trees. If the desired code transmission is blocked by the trees and the undesired code transmission has a direct path to the receiver, ghost satellite error may occur. For prior art receivers, this problem is usually solved by limiting the strength at which valid codes will be read. The ghost signal is usually below a certain amplitude. By amplitude filtering below a certain signal strength, those unwanted signals are eliminated and only strong desired signals are obtained.

This can work for outdoor use of receivers where strong signals are available. For indoor receivers used in embodiments of the present invention, however, such a scheme is ineffective. This is because indoors the desired signal itself may be so weak that it is below the cutoff range for ghost signals. If the low amplitude signals are no longer filtered out, the chance of ghost satellite error returns.

The present invention solves this problem by having a dual path for correlation. In one path a conventional correlator is used to look for energy from correlation of a desired signal. If it finds any signal, it is presumed to be a ghost signal. The first path then inverts this detected signal and provides it to a second correlator path where it cancels out the potential ghost signal and leaves only the potential of the desired signal. If any appreciable signal is obtained at the second correlator path, that signal can be presumed to be the desired signal.

In one embodiment of the present invention, the effect of the undesired satellite can be computed given knowledge of the code phases and the Doppler frequencies and thus be subtracted from the data sample stored in memory unit 730. In practice, this process is iterative; that is, the pseudoranges and signal strengths are estimated and these are subtracted from the contents of the memory unit 730. The subtracting values may be extracted from a table computed in advance and recalculated with respect to an amplitude and phase of the acquired undesired signal.

Embodiment of a Positioning System

Figure 8:
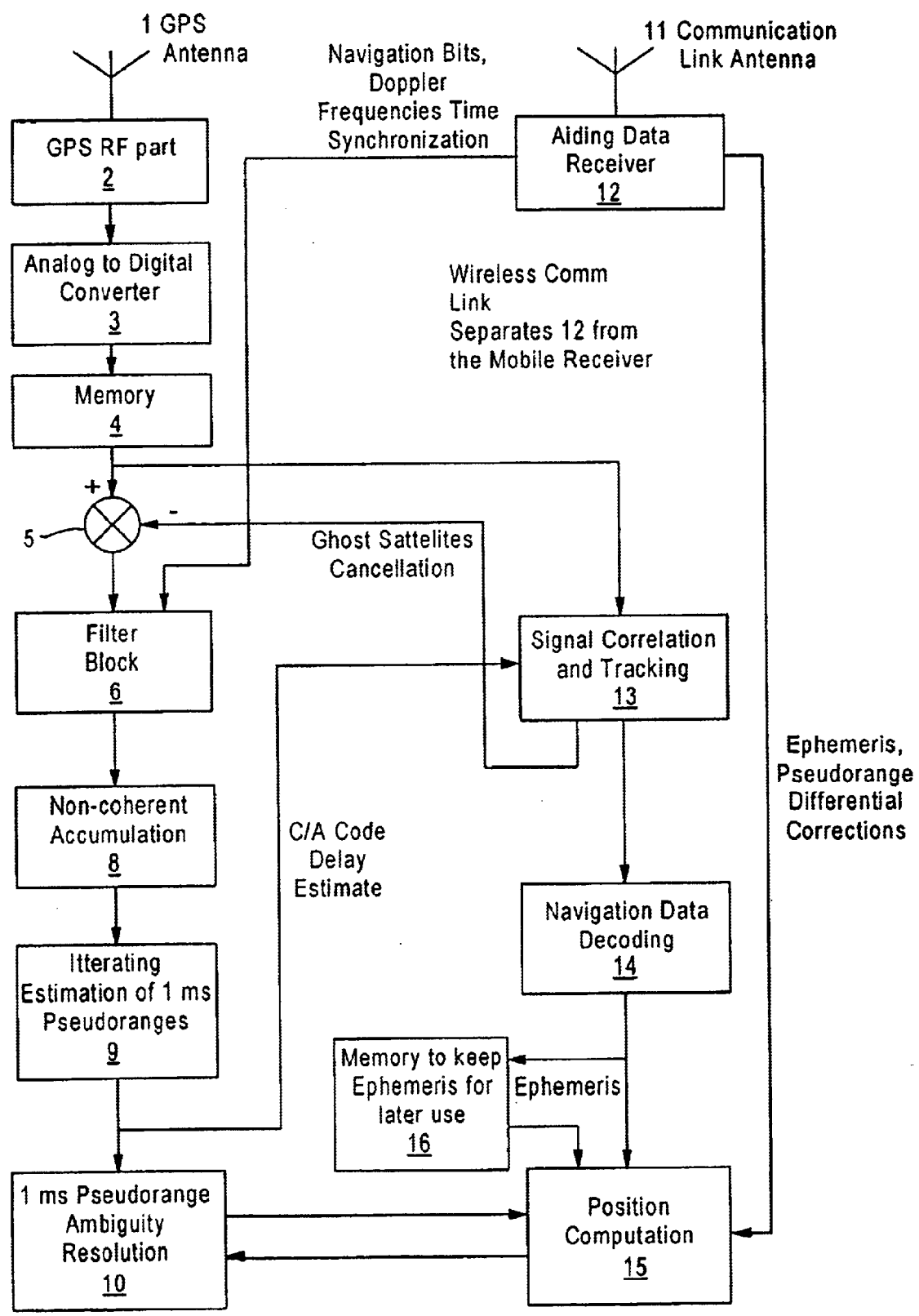
FIG. 8 shows a positioning system according to an embodiment of the present invention.

One embodiment of a positioning system according to the present invention is illustrated in FIG. 8. An assistance receiver 812 is coupled to an antenna 811. The assistance data receiver 812 provides navigation bits, Doppler frequencies, time synchronization, ephemeris data, base station coordinates for 1 ms ambiguity resolution, and pseudo-range differential corrections to a local broadcast network that may be wired, wireless, cellular, or network or internet based.

The SPS receiver in the embodiment of FIG. 8 comprises an antenna 801 coupled to a processing block 802. The outpout of processing block 802 is coupled to A/D converter 803 and memory 804 to difference node 805. The output of node 805 is coupled to filter block 806 along with data from the assistance reciever 812. Filter block 806 is coupled to accumulation block 808 and through iteration block 809 to ambiguity resolution block 810.

The output of memory 804 is also coupled to correlation and tracking block 813 which provides output to difference node 805 and to navigation data decoding block 814. The output of block 814 is coupled to memory 816 and to position computation block 815. Ephemeris data and differential corrections data from the assistance receiver 812 is also coupled to position computation block 815 as is memory 816. The position computation block exchanges data with resolution block 810.

In operation, the received satellite signal from antenna 801 is inputted to an RD processing section 802 which includes conventional means for amplifying the received signal (amplifier), filtering it, and down-converting it to an appropriate intermediate frequency (IF). The amplified and down-converted signal is then applied to a conventional analog to digital (A/D) converter 803. The output of the A/D converter, which represents the digital amplitude samples of the down-converted signal is stored in a memory 804 for subsequent signal processing.

For low SNR processing of signals, it is desirable to eliminate the effects of cross-correlations from satellites other than the satellite being acquired or tracked. The peak cross-correlation coefficient between all conventional GPS C/A Gold Codes is 65/1023. Additionally, frequency offsets may result in this being even higher. To minimize the "ghost satellite" effect, a numerical representation of the undesired signal may be subtracted from the digital samples stored in memory at difference block 805 in FIG. 8. The value to be subtracted is generated by signal correlation and tracking block 813.

The output of difference block 805 is applied at filter block 806. Filter block 806 may be comprised of primary and secondary matched filters, or it may be a single structure such as an FFT, or other convolution or correlation device. The output of filter block 806 is applied to non-coherent accumulator 808 which performs a non-coherent detection and accumulation. The non-coherent detection computes some function of the modulus of the output of block 806. The two functions are the modulus and the modulus squared in one embodiment. Typical coherent integration times are on the order of 100 mSec. Non-coherent accumulation would typically be performed on data corresponding to a one second interval of the received signal.

The output of the cross-coherent accumulator is applied to block 809 that iteratively estimates the sub-millisecond pseudorange to the satellite in question. The pseudorange is ambiguous at the one mSec level. It is the function of ambiguity resolution block 810 to resolve the millisecond ambiguity in the pseudorange in a conventional manner. Block 810 takes as its inputs distances to satellites from a position computation performed at computation block 815.

Assistance data from the aiding receiver 812 communicates the navigation message bits, i.e., telemetry data, Doppler information, base station coordinates for 1 ms ambiguity resolution, PRN numbers and time synchronization information to the filter matched to the C/A and navigation message bits at filter block 806. The aiding SPS receiver also communicates ephemerides and differential corrections (if implemented) to the position computation block 815. Ephemerides may be stored in memory 816 for later use if desired.

The output memory 804 is also connected to the satellite correlation and tracking module 813. In one embodiment, block 813 is a standard SPS correlator. It is aided by the C/A code pseudorange estimates from block 809. The satellite correlation and tracking module 813 is used to derive navigation data from the data stored in memory 804 when the received satellite signal strength is high. In traditional applications, ghost signals are avoided by setting a limit range for a signal to be detected. In obstructed situations, such a limit range may prevent the detection of the actual signal. To avoid this, the present invention contemplates using the conventional correlator path to generate any ghost signal correlation and remove it at the difference block 805.

When the signal is weak, such as in an obstructed area (a low SNR condition), Ephemeris data may be stored in memory 816 wherever and whenever it is found by block 813 and block 814 from the SPS receiver. Then it may be used in later conditions where the signal is too weak to allow Ephemeris data to be collected by the SPS receiver. Thus, operation of the aided SPS receiver may continue for a time (typically up to several hours) until the Ephemeris data goes out of date. (Differential corrections may also be stored but these go out of date much more quickly).

The position computation block 815 takes as its inputs Ephemeris data derived from the navigation message decoded in block 814 (and optionally stored in memory 816), or data from the aiding SPS receiver 812 or the stored message in memory 816. Additionally it may use differential corrections from aiding SPS receiver 812 and pseudoranges from the pseudorange ambiguity resolution module 810.

Three points merit special mention at this point. First, the signal correlation and tracking module 813 does not work independently of the filter matched to the C/A code and navigation message bits (block 806). This is because the SNR of the received signal may be inadequate to allow the received signal to be tracked. By operating on the stored data, the causality requirement of the tracking loops is eliminated. Second, this technique does not compute the full cross-correlation function between the data and the locally generated signals. This is because the correlation coefficients are not computed for the uninteresting lags.

Finally, the data memory size can be reduced to the size necessary to store an amount of data that corresponds to the coherent integration period. If, after processing the first data set it is determined that additional data is needed, additional data may be required and stored in memory 804, processed, and the processed results combined with the results of the first processing results for improved accuracy or strength of a statistical test. Similarly, any number of subsequent samples may be acquired, processed, and incorporated into the pseudorange measurements and position computation.

Filter Block

In one or more embodiments of the present invention, a filter block, such as block 806 of FIG. 8, is used. In one embodiment, filter block 806 is broken into a primary and a secondary matched filter. In operation, the input to the primary matched filter is matched to the product of the C/A code, the telemetry data (navigation bits from the carrier phase reversal signal) and the carrier frequency of the desired satellite signal. This technique differs from techniques that use a filter matched to only the product of the C/A code and a carrier frequency. There are two important differences: First, the technique of using a filter matched to the product which includes telemetry data has the capability to out perform techniques which do not use the telemetry data. This is because the use of the telemetry data allows Longer Coherent Integration of the received signal and subsequently it permits improved post-correlation SNR. Second, the technique of using a filter matched to the product which includes telemetry data differs mathematically from FFT-based techniques which perform convolutions or correlations on the product of the pseudo random noise (PRN) (the C/A code) and the carrier; these FFT-based convolutions or correlations employ circular convolution which implicitly assumes periodic extensions of the PRN code with the same telemetry bit sign.

The output of the primary filter may be viewed as complex correlation coefficients between the data input to the matched filter. This output is applied to a second matched filter. If T denotes the sample period of the primary filter, the ideal matched secondary filter is given by Bracewell's triangle function, the zeros of which correspond to one C/A code "chip" (define), convolved with the baseband equivalent of the composite of filters in the receiver, sampled at an interval T. The purpose of this secondary filter is to improve SNR by the complex correlation coefficients prior to non-coherent detection and subsequent accumulation. Loosely, the secondary filter uses information in samples adjacent to the peak correlation coefficient to improve the SNR. More precisely, to maximize SNR, the complex correlation coefficients are applied sequentially to the filter which has as its impulse response the time-reverse, complex conjugate of the above described filter. Practically, this filter may be approximated by a binary approximation to the ideal response. Since both of these operations are linear, they could, of course, be combined in a single filter. However, to do so would result in a more complex implementation.

In practice, one embodiment of the ghost satellite cancellation may use primary and secondary matched filters. In operation, the process is iterative; that is, the pseudoranges and signal strengths are estimated and these are subtracted from the contents of memory. This cancellation of the effect of undesired satellites may need not be implemented by subtracting from data primarily stored in the memory samples. More generally, the compensation may be done at any stage of data processing before the nonlinear detection operation, i.e., squaring or taking the modulus. In practice, there are computational advantages to performing this subtraction on the output of the filter, matched to the output of the filter, matched to the C/A code and navigation bits or the secondary matched filter. The subtracting values can be extracted from a table computed in advance and recalculated with respect to an amplitude and phase of the acquired undesired signal.

Thus, a method and apparatus for reducing interference in a positioning system is described in conjunction with one or more specific embodiments. The invention is defined by the claims and their full scope of equivalents.

What is claimed is:

1. A positioning system comprising:
    a first correlation path for detecting and correlating satellite position signals and providing an output when a signal is detected;
    a second correlation path for detecting and correlating said satellite position signals;
    a subtractor coupled to said first and second correlation paths for removing said output from an input of said second correlation path resulting in a presumed output signal that cancels out a presumed ghost signal.

2. The positioning system of claim 1 including an assistance signal coupled to said second correlation path.

3. The positioning system of claim 2 wherein said assistance signal includes one or more Doppler frequencies for said satellites.

4. The positioning system of claim 2 wherein said assistance signal includes one or more locations for said satellites.

5. The positioning system of claim 2 wherein said assistance signal includes a list of one or more satellites that are currently available.

6. The positioning system of claim 2 wherein said assistance signal includes one or more navigation bits in said signals from said satellites.

7. A method for using a positioning system receiving signals from one or more satellites comprising the steps of:
    detecting and correlating the signals in a first correlation path and providing an output when a signal is detected and correlated;
    detecting and correlating the signals in a second correlation path having an input;
    subtracting said output from said first correlation path from said input of said second correlation path resulting in a presumed output signal that cancels out a presumed ghost signal.

8. The method of claim 7 further including an assistance signal coupled to said second correlation path.

9. The method of claim 8 wherein said assistance signal includes one or more Doppler frequencies for said satellites.

10. The method of claim 8 wherein said assistance signal includes one or more locations for said satellites.

11. The method of claim 8 wherein said assistance signal includes a list of one or more satellites that are currently available.

12. The method of claim 8 wherein said assistance signal includes a list of one or more navigation bits in said signals from said satellites.

13. The method of claim 1, wherein said first correlation path presumes that the detected signal is a ghost signal.

14. The method of claim 13, wherein the detected signal is inverted and provided as said output to said subtractor.

15. The method of claim 7, comprising said first correlation path presumes that the detected signal is a ghost signal.

16. The method of claim 7, comprising inverting the detected signal and providing said output in said subtracting step.

17. The method of claim 7, wherein the signal detected at the first correlation path is subtracted from a data sample stored in a memory unit, and this value is provided as said output in said subtracting step.

18. The method of claim 17, comprising estimating pseudoranges and signal strengths and subtracting this estimate from the data sample stored in memory.

* * * * *